United States Patent
Korlapati et al.

(10) Patent No.: US 9,436,733 B2
(45) Date of Patent: Sep. 6, 2016

(54) TECHNIQUES FOR QUERY STATISTICS INHERITANCE

(71) Applicant: TERADATA US, INC., Dayton, OH (US)

(72) Inventors: Rama Krishna Korlapati, El Segundo, CA (US); Haiyan Chen, Chappaqua, NY (US)

(73) Assignee: Teradata US, Inc., Dayton, OH (US)

( * ) Notice: Subject to any disclaimer, the term of this patent is extended or adjusted under 35 U.S.C. 154(b) by 368 days.

(21) Appl. No.: 13/722,735

(22) Filed: Dec. 20, 2012

(65) Prior Publication Data

US 2014/0181075 A1 Jun. 26, 2014

(51) Int. Cl.
*G06F 7/00* (2006.01)
*G06F 17/30* (2006.01)

(52) U.S. Cl.
CPC .............................. *G06F 17/30469* (2013.01)

(58) Field of Classification Search
USPC ........................................................ 707/713
See application file for complete search history.

(56) References Cited

U.S. PATENT DOCUMENTS

| 7,386,538 | B2 | 6/2008 | Muras |
| 7,747,609 | B1 | 6/2010 | Au |
| 7,930,296 | B2 | 4/2011 | Muras |
| 2006/0230016 | A1* | 10/2006 | Cunningham et al. ........... 707/2 |

OTHER PUBLICATIONS

Viswanath Poosala, Peter J. Haas, Yannis E. Ioannidis, Eugene J. Shekita, Improved Histograms for Selectivity Estimation of Range Predicates, SIGMOD 1996, published 1996, pp. 294-305.*

* cited by examiner

*Primary Examiner* — Jeffrey A Burke
(74) *Attorney, Agent, or Firm* — Schwegman, Lundberg & Woessner, P.A.

(57) ABSTRACT

Techniques for query statistics inheritance are provided. Statistics for a database are used to determine selectivity estimates for sparse joins and tables being joined together within a given query. These statistics are inherited up to the given query along with the selectivity estimates and provided to a database optimizer to use when developing query plans and selecting an optimal query plan for the given query.

6 Claims, 3 Drawing Sheets

TECHNIQUES FOR QUERY STATISTICS INHERITANCE

BACKGROUND

In large commercial database systems statistics are often gathered for the tables and other constructs of the database. These statistics are useful in identifying costs, which are used to generate an optimal plan for a given query. That is, large scale databases include query optimizers that determine a most efficient way to execute a given query by considering multiple different query plans and the cost of each individual query plan. The statistics are then vital to resolving costs for a given query, and it is the costs that the optimizers use to determine the optimal plan for a given query. Thus, inefficient or inaccurate statistics can adversely impact the performance of the database.

In many cases, the approach used by most database systems is to include statistics for a base table when evaluating a query. However, this is not always an optimal practice, especially when the base table is extremely large (which is common in the industry), which makes collecting statistics prohibitively expensive and when there are other conditions that are crucial to generate an optimal plan for a given query.

Overgeneralizing the statistics for a given query causes the costs of the query to be too high and does not adequately provide the database optimizer with needed information to optimally determine an appropriate query plan.

Another approach has been to use the statistics available in a given query for a join index or use no statistics at all. Such a technique requires converting selectivity estimation on the base table to selectivity estimation on the join index, which requires a lot of computations, including predicate mapping; this approach also lacks flexibility.

However, when the rows are from a same set, the histograms on the same fields are exchangeable; so, statistics can be inherited from one database object (construct) to another. Thus, when statistics on one object are missing, the statistics inherited from the other object can be transparently used, such as statistics on non-sparse join index (a materialized view with no predicates) and its base table.

When a query condition relationship is a superset or a subset, statistics inheritance encounters challenges, since the row filtering condition on the subset side needs to be considered. Furthermore, a solution is needed for combining the selectivity based on statistics inherited from object containing subset rows. From the superset object's view, the row filtering condition on subset object is applied to all of the selectivity estimated using statistics inherited from subset object. Also, when there are multiple objects with subset rows, there is a need to choose the best one or the ones that can coordinate with each other.

SUMMARY

In various embodiments, techniques for query statistics inheritance are presented. According to an embodiment, a method for database query statistics inheritance is provided.

Specifically, a query is received having a database object with a subset of rows defined therein against a base table. Next, statistics for the database object are acquired. Finally, the base table inherits the statistics from the database object.

DETAILED DESCRIPTION

Figure 1:
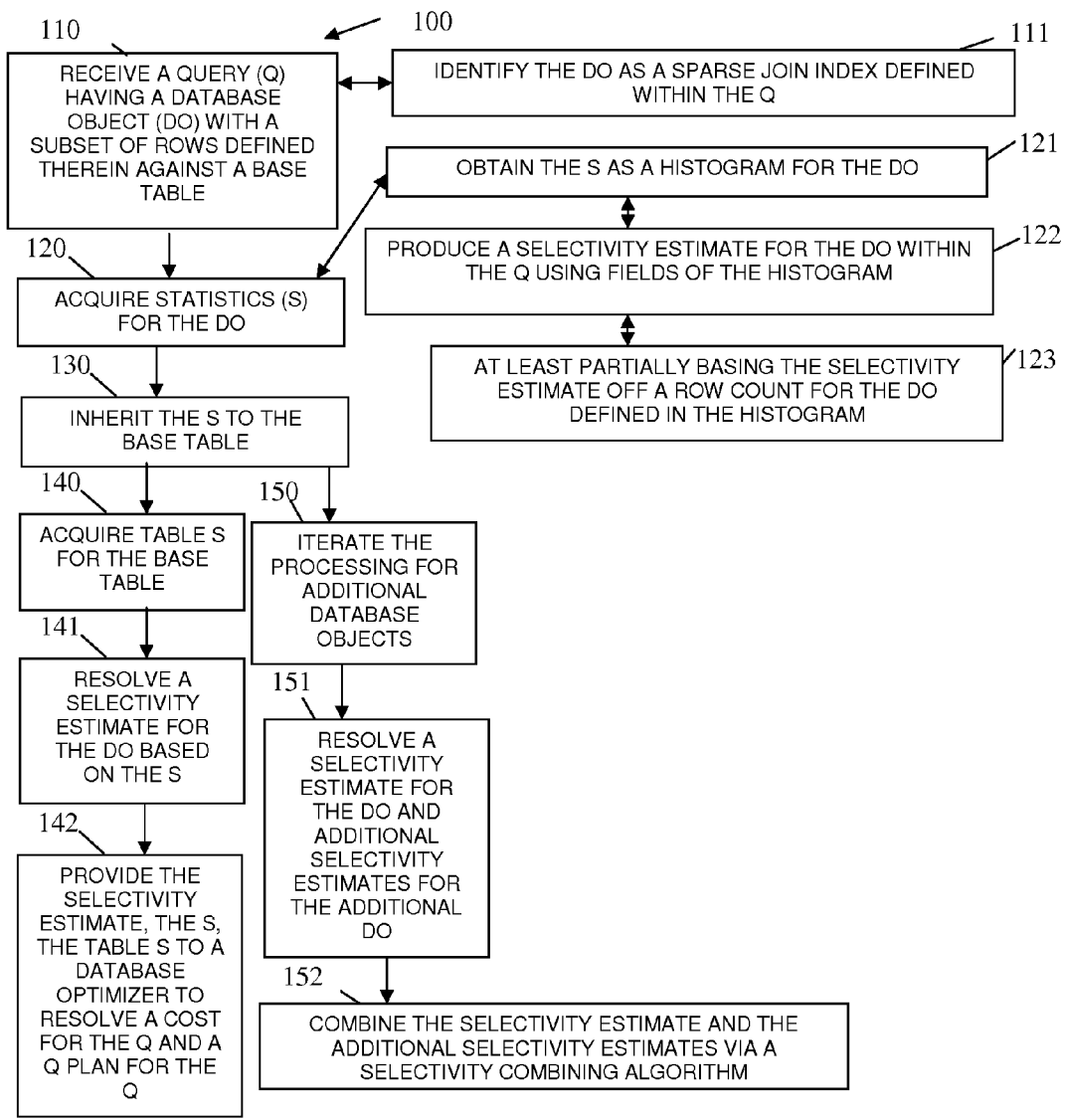
FIG. 1 is a diagram of a method for database query statistics inheritance, according to an example embodiment.

FIG. 1 is a diagram of a method 100 for database query statistics inheritance, according to an example embodiment. The method 100 (hereinafter "statistics resolver") is implemented as executable instructions within memory and/or a non-transitory computer-readable storage medium that execute on one or a plurality of processors, the processors specifically configured to execute the statistics resolver. Moreover, the statistics resolver is programmed within the memory and/or the non-transitory computer-readable storage medium. The statistics resolver may also be operational over a network; the network is wired, wireless, or a combination of wired and wireless.

The statistics resolver uses statistics gathered by a database system for a database optimizer. These statistics are used to resolve selectivity estimates and ultimately costs associated with dynamically presented queries. The selectivity estimates are combined for a given query and in situations where join selectivity is needed a mechanism for determining the row selectivity is determined. The optimizer can then rely on these costs/selectivity estimates when determining a proper query plan for the presented query.

Before discussing the processing of the FIG. 1 for the statistics resolver, details of various embodiments of the statistics resolver and some examples are presented for comprehension and illustration.

Inherit Statistics Collected on Subset Row Set

Initially, to minimize the Central Processing Unit (CPU) or processor time, irrelevant objects are filtered out. When inheriting statistics from a database object having subset rows, which is called the source object of the inherited statistics, the source object satisfies one of following conditions:

source object selects superset of rows of the query results; or source object selects subset of rows of the query results.

For instance, statistics on a source object can be for a sparse join index, whose statistics are inherited to base table, which includes a superset of rows of the sparse join index. The coverage algorithm on the sparse join index and the query is applied to check the usability of the statistics on the sparse join index.

For inheriting statistics from qualified source object having subset rows, the following information is recorded and saved along with it:

inherit Type: for instance, SparseJI-To-BaseTable; and pertinent Information for the source object: so that necessary information, such as the row filtering condition, can be retrieved when needed; one way to save such information is to link to the source object instance.

When consumers of the statistics, such as a selectivity estimation module and a join planning module request statistics, the inherited statistics are treated the same as normal statistics except for some applicable test against the source object for the given task. Both regular statistics, with inherit type as Inherit_None, and inherited statistics, with inherit type as SparseJI-To-BaseTable, NonSparseJI-To-BaseTable etc., are grouped together by statistics fields. In a database optimizer, the grouped statistics are stored in derived statistics record, one per field for single column statistics or a set of fields for multi-column statistics; and ready for access throughout query planning.

Consider the following first example situation.

EXAMPLE 1

SELECT
SUM(L_EXTENDEDPRICE*L_DISCOUNT (FLOAT)) (DECIMAL(18,2)) AS REVENUE
FROM
LINEITEM
WHERE
L_SHIPDATE>='2010-01-01'
AND L_SHIPDATE<DATE '2010-01-01'+INTERVAL '1' YEAR
AND L_DISCOUNT BETWEEN .06−0.01 AND .06+0.01
AND L_QUANTITY<24;

On base table LINEITEM table, the following single column statistics are collected.
COLLECT STATISTICS ON lineitem COLUMN (L_quantity);
There are two sparse join indexes created and statistics collected as identified below:
CREATE JOIN INDEX ji_discount
SELECT *
FROM LINEITEM,
WHERE L_DISCOUNT BETWEEN .06 −0.01 AND .06+0.01
COLLECT STATISTICS ON ji_discount COLUMN (L_shipdate);
COLLECT STATISTICS ON ji_discount COLUMN (L_quantity);
CREATE JOIN INDEX ji_2010
SELECT *
FROM LINEITEM,
WHERE L_SHIPDATE>='2010-01-01'
AND L_SHIPDATE<DATE '2010-01-01'+INTERVAL '1' YEAR;
COLLECT STATISTICS ON ji_2010 COLUMN (L_discount);
COLLECT STATISTICS ON ji_2010 COLUMN (L_quantity);

All statistics on L_quantity are grouped together:
Stats-1 on lineitem;
Stats-2 on ji_discount; and
Stats-3 on ji_2010.
L_discount only has statistics from join index,
Stats-4 on ji_2010 for column(L_discount).
L_shipdate only has statistics from join index,
Stats-5 on ji_discount for column(L_shipdate).

When statistics on L_quantity are requested, all three statistics from stats-1 to stats-3 are considered. The following two sections explain how to use the estimation based on the inherited statistics. For the convenience of the explanation, in the discussion below, sparse join index is used to represent the source object of statistics in general and the base table is used to represent the relation in a user query.

Use Inherited Statistics for Selectivity Estimation

During selectivity estimation, the histogram of an applicable sparse join index is used to produce selectivity of the predicate on the fields of the histogram. Just as the histogram of a base table, if any, is used to do the estimation. The difference is that the selectivity computed with a sparse join index is based on the row count of the sparse join index. The estimation using the histogram in the above example 1 might look like as follows:

stats-1 (L_quantity) on lineitem shows that "L_quantity>24" selects 5,000 rows from 1,000,000 rows in lineitem table. Selectivity is 0.005. Recorded in SelectivityInfo1;

stats-2 (L_quantity) on ji_discount shows that "L_quantity>24" selects 100 rows out of 10,000 rows in ji_discount. Selectivity is 0.01. Recorded in SelectivityInfo2;

stats-3 (L_quantity) on ji_2010 shows that "L_quantity>24" selects 1,000 rows out of 500,000 rows in ji_2020. Selectivity is 0.002. Recorded in SelectivityInfo3;

stats-4 (L_discount) on ji_2010 shows that "L_DISCOUNT BETWEEN .06-0.01 AND .06+0.01" selects 100 rows out of 500,000 rows in ji_2010. Selectivity is 0.0002. Recorded in SelectivityInfo4; and stats-5 (L_shipdate) on ji_discount shows that predicates on L_shipdate
L_SHIPDATE>='2010-01-01'
AND L_SHIPDATE<DATE '2010-01-01'+INTERVAL '1' YEAR; selects 500 rows out of 10,000 rows in ji_discount. Selectivity is 0.05 and recorded in SelectivityInfo5.

Before using this information as the selectivity of the base table, the selectivity from the sparse join index needs to be converted to use the row count of the base table. However, this conversion is not done until the estimations on the same sparse join index are combined first using a regular selectivity combing algorithm. Because, if multiple histograms of the same sparse join index are used, the predicates that their estimation represents at the base table level has overlapping: the sparse join index predicates, and if one of them is chosen for base table level estimation, the others need to be discarded. Thus, the estimation of the multiple histograms on the sparse join index needs to be combined using the row count of the sparse join index with the sparse join index's filtering conditions ignored.

After the selectivity combined on the individual sparse join index is finished, all estimations from the sparse join index, including the combined one for multiple histograms as well as estimation on single histogram, are converted to the base table level, with the sparse join index's predicates considered. Finally, all instances of selectivity on base table level are processed through normal selectivity combining logic. This allows some but not all applicable histograms on a sparse join index to participate in the final selectivity combination. For instance, consider the second example having two join indexes and stats on the two join indexes.

EXAMPLE 2

JI1: a>10 stats on (b), stats on (c)
JI2: b=20 stats on (d)

The best way to compute the selectivity for the query with predicates "a>10 AND b=20 and c=33 and d=44" is to use stats on (ji1.c) and stats on (ji2.d) to do the estimation when no other stats exist.

Use Inherited Statistics for Join Selectivity Estimation

To calculate join selectivity for two tables joined on column with skewed values (some values having frequencies higher than the average frequency), the histograms on the join columns need to be probed on the matching value ranges to determine the accurate join selectivity. When there are single table conditions, the join column's values that survive after applying the single table conditions should be used to get good estimation of join selectivity. One mechanism to find out the join column's survived value range is to use inherited statistics collected on the row set with the single table condition applied, such as the sparse join index.

Since there can be multiple histograms available on the join column(s), including those from sparse join index, a mechanism in picking a best one to use is needed, which is done after all the histograms on the join column are grouped together. The rules to pick the best histogram are (in the listing order):

1) histogram from the database object with a smaller row count is better;
2) histogram with a higher sample percentage is better;
3) histogram of a later version is better; and
4) histogram collected more recently is better.

The best histogram for the join column is checked to see if its value range survives the single table condition, which is determined by:

a) the range conditions on the join column in the single table condition;
b) the row filtering conditions of the source object in the histogram.

The best histogram can be used for join selectivity if conditions in a) and conditions in b) together cover all the single table conditions on the join column's base table.

EXAMPLE 3 explain sel *
from CDWDB2.IP_ORG_FIRM_C a,
CDWDB2.AR_BR_ORG_C b
where a.FIRM_ID='1101'
and a.IP_ID=b.FIRM_IP_ID;
COLLECT STATISTICS ON IP_ORG_FIRM_C COLUMN (FIRM_ID);
COLLECT STATISTICS ON IP_ORG_FIRM_C_COLUMN (IP_ID);
COLLECT STATISTICS ON IP_ORG_FIRM_C COLUMN (FIRM_IP_ID);
create join index CDWDB2.j2 as
sel IP_ID
from CDWDB2.IP_ORG_FIRM_C a
where a.FIRM_ID='1101';
collect stats on CDWDB2.j2 column (IP_ID);

In this case, statistics on (j2.IP_ID) are better than the base table stats, and are therefore selected to do the join selectivity estimation. J2's condition covers the single table condition on a), thus statistics on j2.IP_ID are useful for the skewed JC.

As will become clear from what was discussed above and what is discussed below the embodiments herein teach novel mechanisms for inheriting query statistics from database objects having subset rows, such as sparse join indexes to the base table. The advantages are as follows:

improves the accuracy of single table and join selectivity estimations;
unifies the estimation based on a base table histogram and the estimation based on the statistics inherited from the database object having row filtering conditions;
simplifies the selectivity estimation logic;
provides the flexibility of using multiple sparse join indexes with overlapping fields in the statistics collected and the sparse join index predicates; and
provides a solution for using the statistics inherited from the database object with row filtering condition to accurately estimate the join selectivity with skewed join values.

At 110, the statistics resolver receives a query having a database object with a subset of rows defined against the base table. The database object is a condition defined within the query having a subset of rows.

According to an embodiment, at 111, the statistics resolver identifies the database object as a sparse join index defined within the query.

At 120, the statistics resolver acquires statistics for the database object. The statistics are acquired from the database.

In an embodiment, at 121, the statistics resolver obtains the statistics as a histogram for the database object.

Continuing with the embodiment of 121 and at 122, the statistics resolver produces a selectivity estimate for the database object within the query using fields of the histogram.

Still continuing with the embodiment of 122 and at 123, the statistics resolver at least partially basing the selectivity estimate off a row count for the database object defined in the histogram.

At 130, the statistics resolver inherits the statistics to the base table. That is, the base table is imputed the statistics for the database object.

According to an embodiment, at 140, the statistics resolver acquires table statistics for the base table.

Continuing with the embodiment of 140 and at 141, the statistics resolver resolves a selectivity estimate for the database object based on the statistics.

Still continuing the embodiment of 141 and at 142, the statistics resolver provides the selectivity estimate, the statistics, and the table statistics to a database optimizer to resolve a cost for the query and a query plan for the query.

In an embodiment, at 150, the statistics resolver iterates the processing (110-130) for additional database objects defined within the query.

Continuing with the embodiment of 150 and at 151, the statistics resolver resolves a selectivity estimate for the database object and additional selective estimates of the additional database objects.

Still continuing with the embodiment of 151 and at 152, the statistics resolver combines the selectivity estimate and the additional selectivity estimates via a selectivity combining algorithm.

Figure 2:
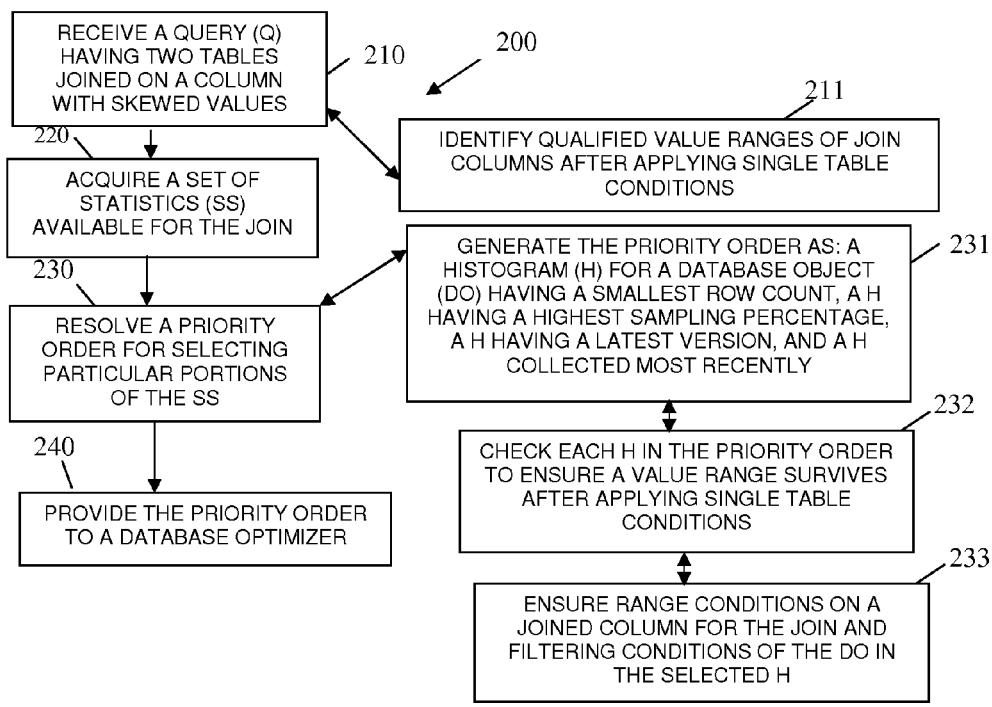
FIG. 2 is a diagram of another method for database query statistics inheritance, according to an example embodiment.

FIG. 2 is a diagram of another method 200 for database query statistics inheritance, according to an example embodiment. The method 200 (hereinafter "statistics selector") is implemented as instructions within memory and/or a non-transitory computer-readable storage medium that execute on one or a plurality of processors, the processors specifically configured to execute the statistics selector. Moreover, the statistics selector is programmed within memory or a non-transitory computer-readable storage medium. The statistics selector may also be operational over a network; the network is wired, wireless, or a combination of wired and wireless.

The statistics selector presents another and in some ways enhanced view of the statistics resolver presented above with respect to the FIG. 1.

At 210, the statistics selector receives a query having two tables joined on a column with skewed values. In other words, the join results in a very large number of rows.

According to an embodiment, at 211, the statistics resolver identifying a range of qualified values for a join condition after applying single table.

At 220, the statistics resolver acquires a set of statistics available for the join.

At 230, the statistics resolver resolves a priority order for selecting particular portions of the set of statistics.

In an embodiment, at 231, the statistics resolver generates the priority order as: 1) a histogram for a database object having a smallest row count; 2) a histogram having a highest sample percentage; 3) a histogram having a highest sample percentage; and 4) a histogram collected most recently.

Continuing with the embodiment of 231 and at 232, the statistics resolver checks each histogram in the priority order to ensure a value range survives after applying the single table conditions.

Still continuing with the embodiment of 232 and at 233, the statistics resolver ensures range conditions on a joined column for the join and row filtering conditions of the database object in the selected histogram.

In an embodiment, at 240, the statistics resolver provides the priority order to a database optimizer.

Figure 3:
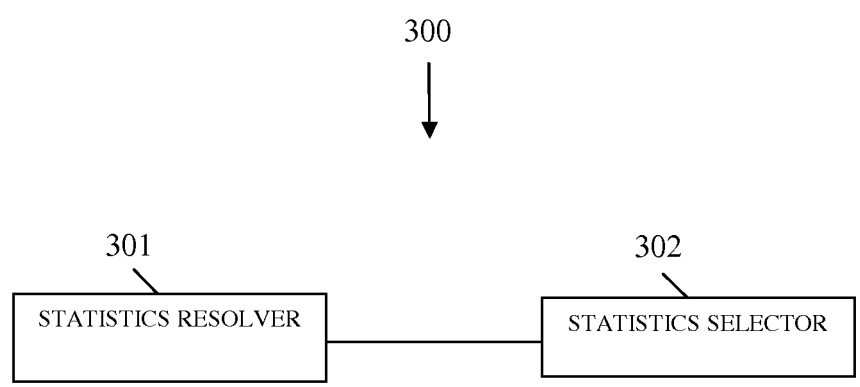
FIG. 3 is a diagram of a database query statistics inheritance system, according to an example embodiment.

FIG. 3 is a diagram of a database query statistics inheritance system 300, according to an example embodiment. The database query statistics inheritance system 300 is implemented, resides, and is programmed within memory or a non-transitory computer-readable storage medium and executes on one or more processors specifically configured to execute the components of the database query statistics inheritance system 300. Moreover, the database query statistics inheritance system 300 may be operational over a network and the network is wired, wireless, or a combination of wired and wireless.

The database query statistics inheritance system 300 implements, inter alia, the techniques presented and described above with reference to the FIGS. 1-2.

The database query statistics inheritance system 300 includes a statistics resolver 301 and a statistics selector 302. Each of these and their interactions with one another will now be discussed in turn.

The memory of the one or more processors is programmed with executable instructions representing the statistics resolver 301 that also processes on the one or more processors. Example processing associated with the statistics resolver 301 was presented above in detail with respect to the FIG. 1.

The statistics resolver 301 is configured to permit resolved statistics for a database object to be inherited to a base table within a query.

According to an embodiment, the statistics resolver 301 is also configured to determine a selectivity estimate for the database object based on the resolved statistics.

The memory of the one or more processors is also programmed with additional executable instructions representing the statistics selector 302 that processes on the one or more processors. Example processing associated with the statistics selector 302 was presented above in detail with respect to the FIG. 1.

The statistics selector 302 is configured to resolve a priority order for a set of statistics associated with two tables being joined on a column with skewed values within the query.

In an embodiment, the statistics selector 302 is configured to select an optimal portion of the statistics from the priority order.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:
   receiving, via the processor, a query having two tables joined on a column with skewed values;
   acquiring, via the processor, a set of statistics available for the join; and
   resolving a priority order for selecting particular portions of the set of statistics after grouping histograms associated with the two tables joined on the column and using the grouped histograms to resolve the priority order, and wherein resolving further includes generating the priority order as 1) firstly identifying a histogram for a database object having a smallest row count; 2) secondly identifying a histogram having a highest sample percentage; 3) thirdly identifying a histogram having a latest version; and 4) fourthly a histogram collected most recently, wherein generating further includes checking each histogram in the priority order to ensure a value range survives after the join, and wherein checking further includes ensuring range conditions on a joined column for the join and row filtering conditions of the database object in the selected histogram.

2. The method of claim 1 further comprising, providing, via the processor, the priority order to a database optimizer.

3. The method of claim 1, wherein receiving further includes identifying a range of values for a join column after apply single table conditions.

4. A processor-implemented system, comprising:
   a memory programmed with a statistics resolver for execution on a processor; and
   the memory also programmed with a statistics selector for execution on the processor;
   the statistics selector is configured to permit resolved statistics for a database object to be inherited to a base table within a query, and the statistics selector is configured to resolve a priority order for selecting particular portions of a set of statistics after grouping histograms associated with two tables being joined on a column with skewed values within the query and using the grouped histograms to resolve the priority order, and wherein resolving further includes generating the priority order as 1) firstly identifying a histogram for a database object having a smallest row count; 2) secondly identifying a histogram having a highest sample percentage; 3) thirdly identifying a histogram having a latest version; and 4) fourthly a histogram collected most recently, wherein generating further includes checking each histogram in the priority order to ensure a value range survives after the join, and wherein checking further includes ensuring range conditions on a joined column for the join and row filtering conditions of the database object in the selected histogram.

5. The system of claim 4, wherein the statistics selector is configured to determine a selectivity estimate for the database object based on the resolved statistics.

6. The system of claim 4, wherein the statistics selector is configured to select an optimal portion of the statistics from the priority order.

* * * * *